United States Patent
Davies et al.

(10) Patent No.: US 6,197,103 B1
(45) Date of Patent: Mar. 6, 2001

(54) PIGMENT COMPOSITION

(75) Inventors: Peter Kingsley Davies, Oldham; John David Schofield, Bury; John Michael McCarthy, Denton, all of (GB)

(73) Assignee: Zeneca Limited, London (GB)

( * ) Notice: Subject to any disclaimer, the term of this patent is extended or adjusted under 35 U.S.C. 154(b) by 0 days.

(21) Appl. No.: 08/338,830

(22) Filed: Nov. 10, 1994

Related U.S. Application Data

(63) Continuation of application No. 08/188,742, filed on Jan. 31, 1994, now abandoned, which is a continuation of application No. 08/011,695, filed on Feb. 1, 1993, now abandoned.

(30) Foreign Application Priority Data

Feb. 4, 1992 (GB) .................................................. 9202291

(51) Int. Cl.$^7$ ........................... C09B 47/00; C09B 47/04; C09B 47/12; C09B 47/16
(52) U.S. Cl. ............................................. 106/410; 106/411
(58) Field of Search ..................................... 106/410, 411

(56) References Cited

U.S. PATENT DOCUMENTS

| | | | |
|---|---|---|---|
| 3,028,392 | * 4/1962 | Dudnikov | 106/410 |
| 3,729,330 | * 4/1973 | Leister et al. | 106/411 |
| 4,152,171 | * 5/1979 | Barraclough et al. | 106/411 |
| 5,024,926 | 6/1991 | Itoh et al. | 430/495 |

FOREIGN PATENT DOCUMENTS

| | | | |
|---|---|---|---|
| 239496 | 4/1987 | (CS) . | |
| 0337209 | 10/1989 | (EP) | C09B/47/04 |
| 2207172 | 6/1974 | (FR) | C09B/47/06 |
| 2321527 | 3/1977 | (FR) | C09B/47/04 |
| 1422834 | 11/1973 | (GB) . | |
| 81-120063 | 2/1981 | (JP) . | |

OTHER PUBLICATIONS

Chemical Abstracts, vol. 95, No. 8, Abstract No. 63686K, Aug. 24, 1981.

FIAT Final Report, No. 1313, vol. 3, pp. 273 and 322–3 (No Date).

* cited by examiner

Primary Examiner—Mark L. Bell
Assistant Examiner—Michael J. DiVerdi
(74) Attorney, Agent, or Firm—Pillsbury Madison & Sutro LLP

(57) ABSTRACT

A composition of copper phthalocyanines containing, on average, from 0.1 to 3 methyl groups per phthalocyanine nucleus. The composition is suitable for the coloration of paints and plastics materials.

8 Claims, No Drawings

PIGMENT COMPOSITION

This is a continuation of application Ser. No. 08/188,742, filed on Jan. 31, 1994, now abandoned, which was abandoned upon the filing hereof, which is a Rule 62 FWC of application Ser. No. 08/011,695, filed Feb. 1, 1993, abandoned.

This specification describes an invention relating to a phthalocyanine composition and more especially to a composition containing a methylated copper phthalocyanine.

For the sake of brevity, copper phthalocyanine is hereinafter referred to as CuPc and the prefix, chloro-, alkyl- or methyl- is used to denote CuPc in which one or more of the sixteen peripheral hydrogen atoms is replaced by chlorine atoms or by alkyl or methyl groups respectively.

It is known that copper phthalocyanine can exist in several crystal forms which are commonly characterised by their X-ray diffraction spectra. Among known crystal forms, the beta-form has a greenish hue, whilst the alpha-form has a reddish hue. Both colour shades are desirable for the colouration of surface coatings and polymers. The beta-form is usually stable with regard to its crystal structure in the presence of solvents commonly used in the manufacture of paints, such as ethers, esters, ketones and especially aromatic hydrocarbon derived solvents. However, the alpha-form tends to recrystallise in the presence of such solvents, and this recrystallisation is associated with a decrease in colour strength and a bathochromic shift of hue. This change may only become apparent on storage for a long period, or at an elevated temperature, or in the presence of a large amount of an inorganic pigment, such as $TiO_2$, or in a combination of these conditions.

Methods for inhibiting this tendency to recrystallise are known, see for example, "The Phthalocyanines, Vol.II, Manufacture and Applications" by Moser and Thomas, (1983, CRC Press). One method involves the replacement of some molecules of CuPc in the crystals of alpha-form CuPc by molecules of chloro-CuPc. However, as monochloro-CuPc is greener than alpha-form CuPc, this approach generally results in a significant bathochromic shift from the desirable reddish hue of alpha-form CuPc. Another proposed method (see GB 1,422,834) involves replacing up to 10% of the CuPc molecules with molecules of a $C_{3-9}$-alkyl-CuPc which is alleged to inhibit recrystallisation without shifting the hue of the alpha-form CuPc because the alkyl-CuPc has a similar reddish hue.

It has now been surprisingly found that the partial replacement of CuPc molecules in alpha-form CuPc by methyl-CuPc will also inhibit the tendency of the alpha-form to recrystallise in the presence of the aforementioned solvents and thus inhibit a decrease in colour strength and a bathochromic hue shift, on storage.

According to the present invention there is provided a composition of copper phthalocyanines containing, on average, from 0.1 to 3 methyl groups per phthalocyanine nucleus.

The composition may comprise a mixture of methyl-CuPc having different numbers of methyl groups. Each methyl-CuPc in the composition may contain one, two, three or four methyl groups on the phthalocyanine nucleus and a typical composition may contain any or all of these together with CuPc which is free from methyl groups.

The composition preferably contains from 0.2 to 2.0, more preferably from 0.2 to 1.0, and especially from 0.3 to 0.7 methyl groups per phthalocyanine nucleus.

The phthalocyanine nucleus of any CuPc in the composition may carry up to 1 substituent group per phthalocyanine nucleus of another species, such as halogen, especially chlorine or bromine or $C_{1-4}$-alkoxy, but is preferably unsubstituted.

A preferred composition comprises a mixture of two or more of the following species, monomethyl-CuPc, dimethyl-CuPc, trimethyl-CuPc and tetramethyl-CuPc and CuPc, with a preference for a preponderance of CuPc and monomethyl-CuPc. Where the phthalocyanine nucleus carries more than one methyl group, the methyl groups are preferably present on different peripheral benzene rings of the phthalocyanine nucleus.

The composition may be synthesised by partial replacement of the phthalic anhydride, phthalic acid or phthalonitrile used in the preparation of CuPc by an equivalent amount of methylphthalic anhydride, methylphthalic acid or methylphthalonitrile. To synthesise the composition directly, from 2.5% to 75% of the phthalic anhydride, phthalic acid or phthalonitrile used in the preparation of CuPc may be replaced by an equivalent amount of methylphthalic anhydride, methylphthalic acid or methylphthalonitrile. However, the present composition can be prepared indirectly, by the addition of a higher or lower proportion of methylphthalic anhydride, methylphthalic acid or methylphthalonitrile and sufficient CuPc or methyl-CuPc respectively is added subsequently to bring the number of methyl groups per phthalocyanine nucleus within the defined range.

According to a further feature of the present invention there is provided a composition as hereinbefore defined incorporating a deflocculating agent. In the context of the present application a deflocculating agent is one which enhances the resistance of the pigment to flocculation. Some of these agents also improve the fluidity of a dispersion of the pigment in an organic liquid.

A preferred deflocculating agent is a phthalocyanine, especially CuPc, carrying acidic or basic groups. The deflocculating agent preferably contains up to four acidic or basic groups which are preferably selected from acidic groups such as —$SO_3M$ and $CO_2M$, in which M is H, alkali metal, ammonium or substituted ammonium, and from basic groups such as

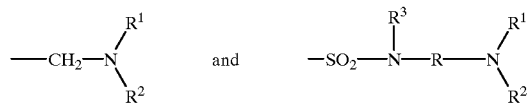

in which
$R^1$ & $R^2$ are each independently H or $C_{1-4}$-alkyl, and
R is alkylene, alkenylene, cycloalkylene or R, $R^2$ and $R^3$ together with the N atoms to which they are attached form an aliphatic heterocycle, such as pyrazine, any of which may be substituted by a group selected from halogen, especially chlorine, $C_{1-4}$-alkoxy and hydroxy.
Examples of a suitable deflocculating agents are

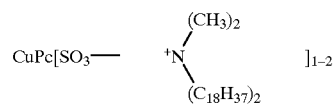

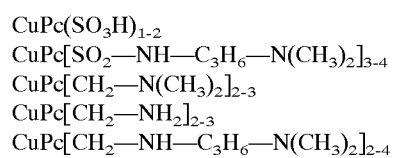

CuPc[CH$_2$—NH—CH(CH$_3$)$_2$]$_{2-4}$
CuPc[CH$_2$—O—(CO—[CH$_2$]$_{17}$—O)$_6$—H]$_3$

The composition preferably contains up to 15%, more preferably from 4% to 10%, of the deflocculating agent.

The composition may contain other components which are typically present in commercial pigments such as surfactants and dispersants, resins, amines, especially fatty aliphatic amines, and preservatives The pigment composition is preferably in a pigmentary form, that is in finely divided condition in which the average size of the pigment particles, along their longest axes, is below 10 micron and more preferably below 1 micron.

The composition may be converted into a pigmentary form in various ways.

(1) The composition, and optionally a deflocculating agent as hereinbefore described, may be milled in solid form, preferably in the presence of a grinding aid such as an inorganic salt, for example sodium chloride, carbonate or sulphate. The inorganic salt may be removed in a known manner, for example by solution in water, and the pigment composition may be dried.

(2) The composition, and optionally a deflocculating agent as hereinbefore described, may be dissolved in a solvent such as sulphuric acid, and precipitated by drowning the solution into a non-solvent such as water, preferably under turbulent mixing conditions.

(3) An aqueous suspension of the composition may be milled in the presence of a hydrolysable surfactant such as sodium decyl-sulphate. The surfactant may then be hydrolysed by an appropriate treatment with acid or base, and the surfactant and its hydrolytic products then partially or totally removed by filtration of the pigmentary form followed by washing with a liquid such as water. The pigmentary composition may then be dried.

(4) An aqueous suspension of the composition may be milled, optionally in the presence of a basic deflocculating agent as hereinbefore described, and in the presence of an acid such as acetic acid, and optionally in the presence of an organic solvent. Examples of such solvents are disclosed in UK patent 1113060. The suspension may then be basified to liberate the free base form of the deflocculating agent, and the pigmentary composition may be obtained by filtration, washing (preferably with water) and drying.

Alternatively the composition may be converted into a pigmentary form by one of the aformentioned processes, preferably selected from 1, 2 or 3 above, without the deflocculating agent, and subsequently treated with the deflocculating agent. The pigmentary composition may be treated with the deflocculating agent in any suitable manner. Thus, the deflocculating agent may be dissolved in a suitable solvent system, mixed with the pigmentary composition, and the solvent removed by evaporation; or the deflocculating agent may be deposited onto the surface of the pigmentary composition by changing the pH of the solution so as to bring the deflocculating agent out of solution and deposit it onto the surface of the pigment and residual solvent removed by filtration; or the pigmentary composition may be mixed with a fine dispersion of the deflocculating agent, and the solvent removed by evaporation or filtration, to give an intimate mixture of pigmentary composition and deflocculating agent.

In the pigmentary form of the composition, any CuPc present is preferably in the alpha-form, but may be a mixture of alpha-form and other forms, such as beta-form. However, preferably at least 80%, more preferably at least 90%, and especially at least 98%, of any CuPc in the pigmentary form of the composition is alpha-form CuPc. If the pigmentary form is prepared by method 2 above, any CuPc present is automatically converted into the alpha-form. If the pigmentary form is prepared by another method, such as method 1, 3 or 4 above, which does not automatically convert CuPc into the alpha-form, any CuPc to be incorporated into the composition may be converted into the alpha-form by a suitable treatment, such as reaction with a strong acid, e.g. concentrated sulphuric acid, followed by drowning into water.

The present compositions have been found to exhibit generally good resistance to recrystallisation on storage in the presence of solvents and are therefore very suitable for use in compositions comprising organic solvents such as paints and inks. Some of the compositions also show improved heat resistance compared with untreated alpha-form CuPc and the compositions are also suitable for use in the coloration of plastics materials, especially polyolefines, ABS, polystyrenes, polyamides, polyesters, polysulphones, polyether ketones, polyetherether ketones and polyethersulphones which are generally processed at relatively high temperatures.

Tests for determining the stability of CuPC pigments against recrystallisation as hereinbefore described include heating or boiling in ethers, esters, ketones and aromatic hydrocarbons or mixtures thereof or mixtures with other organic liquids, especially those used in paint media.

The invention is further illustrated by the following Examples in which all parts and percentage are by weight unless otherwise indicated.

EXAMPLES

Intermediate 1

A mixture of 122.2 g of phthalic anhydride, 28.4 g of methyl-phthalic anhydride, 34.6 g anhydrous copper (II) chloride, 231.1 g urea, 1.5 g sodium molybdate and 600 mls of 1,2,4-trichlorobenzene was stirred and heated to 140° C. over 30 minutes. The temperature was raised to 175° C. over 75 minutes and held for 60 minutes before raising to 190° C. over 30 minutes. The reaction mixture was stirred for 225 minutes at 190° C. The CuPc was worked up by removing the 1,2,4-trichlorobenzene by steam distillation and refluxing with 10% sulphuric acid for 4 hours at 95° C. The CuPc, containing an average of 0.7 methyl groups per phthalocyanine nucleus, was filtered, washed until free of acid and dried.

Intermediate 2

A sample of 50 g of Intermediate 1 was treated with 98% sulphuric acid, poured into water, filtered, washed acid free and dried, producing alpha-form CuPc containing an average of 0.7 methyl groups per phthalocyanine nucleus.

Intermediate 3

This was prepared from a mixture of 74.8 g of phthalic anhydride, 83.6 g 4-methylphthalic anhydride, 34.6 g anhydrous copper (II) chloride, 231.1 g Urea, 1.5 g sodium molybdate and 600 ml 1,2,4-trichlorobenzene by the method described for Intermediate 1. The product is CuPc containing an average of 2.0 methyl groups per phthalocyanine nucleus.

Intermediate 4

This was prepared from a mixture of 37.7 g of phthalic anhydride, 125.4 g 4-methylphthalic anhydride, 34.6 g anhydrous copper (II) chloride, 231.1 g Urea, 1.5 g sodium molybdate and 600 ml 1,2,4-trichlorobenzene by the method described for Intermediate 1. The product is CuPc containing an average of 3.0 methyl groups per phthalocyanine nucleus.

Intermediate 5

This was made by dissolving 100 g of Intermediate 4 in 767 g 98% sulphuric acid, and adding the solution dropwise into 2500 g of stirred water at 80° C. The product was then filtered, washed acid free and dried.

Example 1

A mixed pigment (70 g) consisting of 28 g of alpha-form CuPc and 42 g of Intermediate 2, containing an average of 0.42 methyl groups per phthalocyanine nucleus, was dispersed into 280 g of an aqueous solution of 4.2 g of $CuPc-(SO_2NHC_3H_6NMe_2)_3$ (deflocculating agent), 13.7 g of glacial acetic acid and 19.2 g of 2 butoxyethanol by use of a high speed mixer. The dispersion was bead milled for 2 hours at a peripheral speed of ca 10 $m.s^{-1}$ with approximately 100 ml water being added after 30 mins to maintain sufficient fluidity during the milling. The pigment suspension was then diluted to 5% pigment concentration before making alkaline (pH 10) by stirring and adding 2M sodium hydroxide. The flocculated suspension was heated to 80° C. and maintained at this temperature for 60 minutes. The pigment was then filtered, washed with water and dried to give a red shade solvent stable, flocculation resistant, alpha-form CuPc pigment.

Example 2

The mixed pigment used in Example 1 (70 g) was dispersed into 280 g of an aqueous solution of 10.5 g of sodium decylsulphate by use of a high speed mixer. The dispersion was bead milled for 2 hours at a peripheral speed of ca 10 $m.s^{-1}$. The pigment suspension was then adjusted to pH 1.8 by the addition, with stirring, of 20% sulphuric acid. Hydrolysis of the surfactant was carried out by heating the suspension to 90° C. and maintaining at this temperature for 4 hours. The pigment was then filtered, washed with water and dried to give a red shade solvent stable, alpha-form CuPc pigment.

Comparative Example 1

The procedure of Example 1 was repeated using 70 g of alpha-form CuPc. The product is a red-shade, flocculation resistant, solvent-unstable, alpha-form CuPc pigment.

Comparative Example 2

Alpha-form CuPc (70 g) was dispersed into 280 g of an aqueous solution of 10.5 g sodium decylsulphate with a high speed mixer. The dispersion was bead milled for a total of 4 hours at a peripheral disc speed of ca. 10 $m.s^{-1}$, 200 ml water being added after 1 hour to maintain sufficient fluidity, and 19.25 g 2-butoxyethanol being added after 2 hours. The pigment suspension was then adjusted to pH1.8 by the addition, with stirring, of 20% sulphuric acid. Hydrolysis of the surfactant was carried out by heating the suspension to 90° C. and maintaining this temperature for 12 hours. The pigment was then filtered, washed with water and dried to give a red-shade, solvent-unstable, alpha-form CuPc pigment.

Comparative Example 3

A one pint tin can (diameter 9 cm, length 10 cm) was charged with 950 g of a mixture of steel balls (diameters 0.9 cm, 0.75 cm and 0.4 cm), 65 g soda ash and 11.2 g crude CuPc. The can was rotated at 100 rpm for 9 days, opening occasionally to break up any "caked" material. The contents of the tin were washed out with 1l of distilled water, the steel balls removed, the washings heated at 70° C. for 1 hour, and then filtered, washed with further water and dried. The product is a red-shade, solvent-unstable, alpha-form CuPc pigment.

Example 3

This was prepared in the same way as Comparative Example 3, except that the crude CuPc was replaced by 11.2 g Intermediate 3. The product is a red-shade, solvent-stable alpha-form CuPc pigment.

Example 4

This was prepared in the same way as Example 2, except that 20 g of the water in the aqueous solution was replaced by 20 g 2-butoxyethanol and the suspension was heated for 12 hours at 90° C. rather than 4 hours. The product, a red-shade, solvent-stable, alpha-form CuPc pigment, was not dried but kept in paste form.

Example 5

A portion of the paste from Example 4 was freeze dried, to give a red-shade, alpha-form CuPc pigment (containing an average of 0.42 methyl groups per phthalocyanine nucleus) suitable for use in the coloration of plastics.

Example 6

A portion of paste from Example 4 containing log dry weight of product, was re-slurried in 100 g water. 1.5 g $CuPc(SO_3H)_{1.3}$ was added, and then mixed in under high shear conditions for 30 minutes. The resultant slurry was dried without prior filtration to give a surface treated, red-shade, solvent-stable, alpha-form CuPc pigment.

Example 7

A portion (5 g) of the pigment made by drying the paste described in Example 4 was added to a solution of 0.25 g of $CuPc\{CH_2-O-[-CO-(CH_2)_{17}-O]_6-H\}_3$ (defluccoluating agent) in 50 ml hexane. The suspension was mixed under high shear and the solvent then removed by distillation under vacuum. The product is a red-shade, solvent-stable, flocculation-resistant, alpha-form CuPc pigment.

Example 8

This was prepared in the same way as Comparative Example 3, except that 11.0 g of Intermediate 1 was used in place of the 11.2 g of crude CuPc. The product is a red-shade, solvent-stable, alpha-form CuPc pigment.

Example 9

This was prepared in the same way as Example 1, except that the deflocculating agent was replaced by 5.6 g of $CuPc\{CH_2-N(CH_3)_2\}_{2.5}$. The product is a red-shade, solvent-stable, flocculation-resistant, alpha-form CuPc pigment.

Example 10

This was prepared in the same way as Comparative Example 3, except that the crude CuPc was replaced by a mixture of 10.45 g of Intermediate 1 and 0.55 g of the dimethyldioctadecylammonium salt of $CuPc(SO_3H)_{1.3}$. The product is a surface treated, red-shade, solvent-stable, alpha-form CuPc pigment.

Example 11

This was prepared in the same way as Example 1, except that the 70 g of mixed pigment was replaced by 70 g of Intermediate 5. The product is a red-shade, flocculation-resistant, solvent-stable, alpha-form CuPc pigment.

Example 12

A portion of paste from Example 4 containing 10 g dry weight of product, was re-slurried in 100 g water. A solution of 1 g of $CuPc\{CH_2-NH-CH(CH_3)_2\}_3$ (deflocculating agent) in 30% by weight acetic acid was added, and then mixed under high shear conditions. The pH of the suspension was adjusted to 10 with 2N NaOH and the solid filtered, washed and dried to give a red-shade, solvent-stable, flocculation-resistant alpha-form CuPc pigment.

Example 13

This was prepared in the same way as Example 1, except that the 70 g of mixed pigment was replaced by 39 g of alpha-form CuPc and 31 g of Intermediate 2. The product (CuPc containing an average of 0.31 methyl groups per phthalocyanine nucleus) is a red-shade, flocculation-resistant, solvent-stable, alpha-form CuPc pigment.

Comparative Example 4

Alpha-form CuPc (70 g) was dispersed into 280 g. of an aqueous solution of 10.5 g sodium decylsulphate and 20 g. 2-butoxyethanol by use of a high speed mixer. The dispersion was bead milled for a total of 2 hours at a peripheral disc speed of ca 10 $m.s^{-1}$. The pigment suspension was then adjusted to pH 1.8 by the addition, with stirring, of 20% sulphuric acid. Hydrolysis of the surfactant was carried out by heating the suspension to 90° C. and maintaining this temperature for 12 hours. The pigment was filtered, washed with water and freeze-dried to give a red-shade, relatively heat-unstable, alpha-form CuPc pigment.

Method for evaluating the tinctorial properties of CuPc pigments

Acid-refined linseed oil (4 drops) is placed on the bottom plate of an automatic muller and 0.1 g of the CuPc pigment under test is sprinkled on top of the oil. The top glass plate is brought down, and full weight is applied. 100 rotations are made, the plates are opened so that the sample can be scraped back to the middle of the plate, and a further 100 rotations are then made. 4 g zinc oxide is split into 3 equal portions. Each portion is added in turn, together with 10 drops of the linseed oil, and 50 rotations are made. A further 10 drops of the linseed oil are then added, and 50 rotations made. Finally another 200 rotations are made, with stops to scrape the sample back to the middle of the plate every 50 rotations. The sample is scraped off the glass plate and drawn on to a glass slide, alongside a control made from an appropriate CuPc pigment. The sample is assessed versus control for strength and, optionally, hue and/or brightness.

Method for evaluating the solvent stability of CuPc pigments

CuPc (0.5 g) pigment is mixed with 10 ml xylene, the mixture is shaken vigorously, and is then allowed to stand for 72 hours at 70° C. After cooling, the sample is filtered, and the residue dried at 70° C. The tinctorial properties of the sample are then assessed by the method described above, using as the control a sample of the same pigment, that has not been subjected to this solvent treatment.

Tests on the Solvent Stability of various Examples and Comparative Examples

| Sample | Strength |
| --- | --- |
| Comparative Example 1 | approx. 600:100 weak |
| Comparative Example 2 | approx. 400:100 weak |
| Comparative Example 3 | approx. 500:100 weak |
| Example 1 | equal |
| Example 2 | approx. 120:100 weak |
| Example 3 | equal |
| Example 8 | 107.5:100 weak |
| Example 9 | 107.5:100 weak |
| Example 11 | approx. 50:100 strong |
| Example 12 | approx. 150:100 weak |

Method for evaluating heat stability in HDPE 0.1% by weight of Example or Comparative and 1.0% by weight $TiO_2$ (Tioxide R-FC5) are dispersed into high density polyethylene (HDPE) by conventional processing machinery. Samples of the coloured HDPE are then maintained at a range of elevated temperatures between 200° C. and 300° C. for 10 minutes. The difference in colour between each sample, and a control which has not been subjected to this thermal treatment, is measured on an ICS Spectraflash 500. This difference is quoted as delta E, the colour difference is calculated by the CIELAB equation. A colour difference greater than 1.7 may be regarded as an indication of unsatisfactory heat stability.

Heat Stability of Comparative Example 4

| Temperature | delta E |
| --- | --- |
| 200° C. | 5.8 |
| 220° C. | 5.8 |
| 240° C. | 6.7 |
| 260° C. | 6.8 |
| 280° C. | 7.3 |
| 300° C. | 8.3 |

Heat Stability of Example 5

| Temperature | delta E |
| --- | --- |
| 200° C. | 0.6 |
| 220° C. | 0.27 |
| 240° C. | 0.61 |
| 260° C. | 1.2 |
| 280° C. | 3.3 |
| 300° C. | 6.4 |

What is claimed is:
1. A composition comprising
(a) a mixture of copper phthalocyanines containing, on average, from 0.1 to 3 methyl groups per phthalocyanine nucleus; and
(b) a deflocculating agent comprising a copper phthalocyanine containing up to four basic groups selected from those of Formulae (1) and (2),

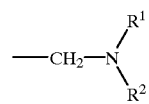
Formula (1)

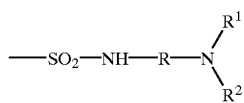
Formula (2)

wherein,
$R^1$ & $R^2$ are each independently H or $C_{1-4}$-alkyl; and
R is selected from alkylene, alkenylene and cycloalkylene.

2. A composition according to claim 1 wherein the mixture of copper phthalocyanine (a) contains from 0.2 to 1.0 methyl groups per phthalocyanine nucleus.

3. A composition according to claim 1 wherein the mixture of copper phthalocyanine (a) contains from 0.3 to 0.7 methyl groups per phthalocyanine nucleus.

4. A composition according to claim 1 wherein the mixture of copper phthalocyanines (a) comprises unsubstituted copper phthalocyanine and at least one species selected from the group consisting of copper monomethylphthalocyanine, copper dimethyl-phthalocyanine, copper trimethylphthalocyanine and copper tetramethyl-phthalocyanine.

5. A composition according to claim 4 wherein the mixture of copper phthalocyanine comprises a preponderance of unsubstituted copper phthalocyanine and copper monomethylphthalocyanine.

6. A composition according to claim 4 or claim 5 wherein at least 98% of any unsubstituted copper phthalocyanine is in the alpha-form.

7. A paint comprising a dispersion of a pigment composition according to claim 1 in an organic solvent.

8. A plastics material containing dispersed therein a pigment composition according to claim 1.

* * * * *